United States Patent [19]
Smith et al.

[11] Patent Number: 5,848,870
[45] Date of Patent: Dec. 15, 1998

[54] SINGLE PERSON CATERING VEHICLE

[75] Inventors: Danny G. Smith, Collierville; Kenneth Hobe, Memphis, both of Tenn.; Joe A. Pierson, Walls, Miss.

[73] Assignee: Smith Transportation Equipment, Inc., Byhalia, Miss.

[21] Appl. No.: 839,689

[22] Filed: Apr. 15, 1997

[51] Int. Cl.⁶ .................................................. B60P 1/02
[52] U.S. Cl. .................... 414/540; 296/26.05; 414/347; 414/495; 414/809; 414/812
[58] Field of Search .................................. 414/347, 495, 414/540, 786, 809, 812, 545; 296/26.05, 26.04; 187/203, 240

[56]         References Cited

U.S. PATENT DOCUMENTS

| 3,103,291 | 9/1963 | Cresci et al. ............................ 414/495 |
|---|---|---|
| 3,499,562 | 3/1970 | Phillips .................................... 414/495 |
| 3,666,127 | 5/1972 | Guyaux ................................ 414/347 X |
| 3,687,321 | 8/1972 | Goodhart et al. ....................... 414/495 |
| 4,103,958 | 8/1978 | Parent .............................. 296/26.05 X |
| 4,690,606 | 9/1987 | Ross ........................................ 414/495 |
| 5,205,697 | 4/1993 | Getty et al. ......................... 414/347 X |
| 5,525,019 | 6/1996 | Moore et al. ........................... 414/347 |
| 5,630,694 | 5/1997 | Ihara ....................................... 414/495 |

FOREIGN PATENT DOCUMENTS 1023406  1/1958  Germany ............................... 414/540

*Primary Examiner*—David A. Bucci
*Attorney, Agent, or Firm*—Niro, Scavone, Haller & Niro

[57]            ABSTRACT

An elevated service vehicle, such as a catering vehicle, with a fixed elevated cargo area, a rear elevator to load cargo from a lower level, and a raisable loading platform positioned over the cab, for servicing elevated areas such as an airplane or the like. A vertically movable canopy covers the cargo area. The vehicle can be controlled by a single operator.

14 Claims, 5 Drawing Sheets

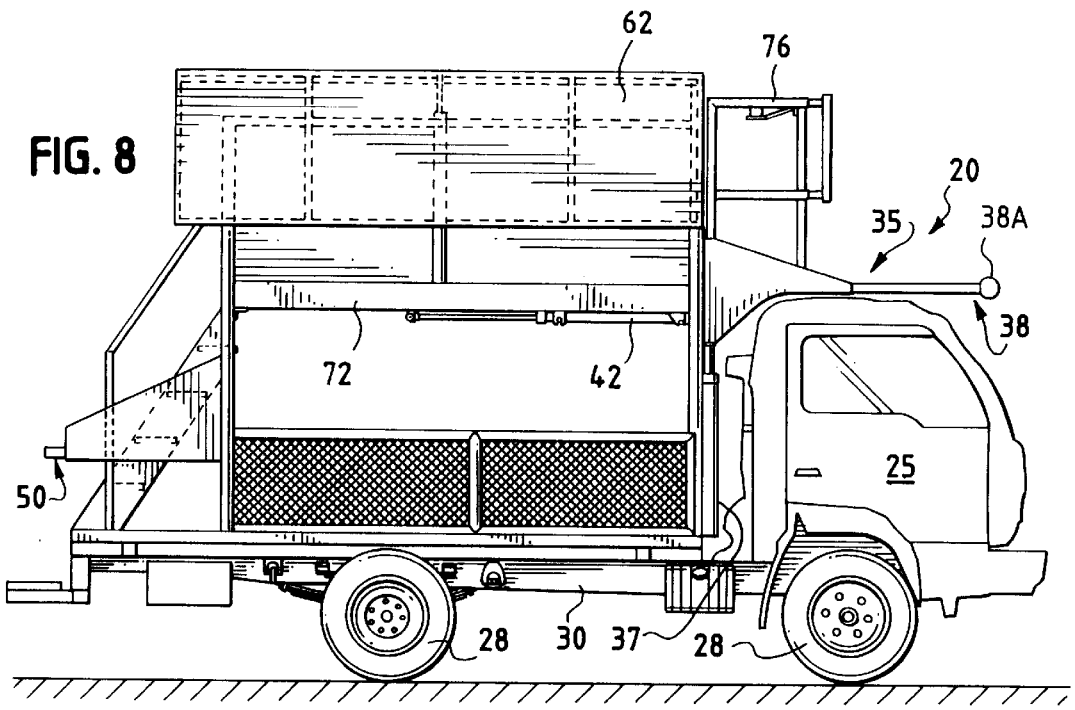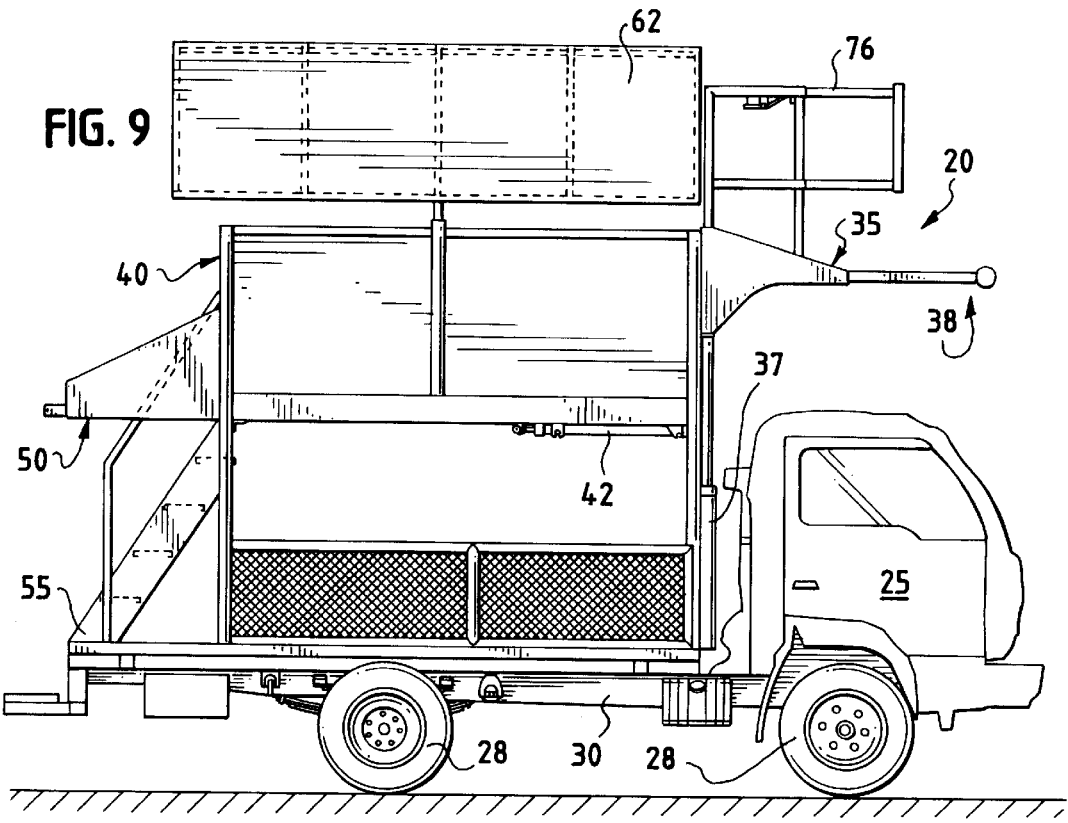

SINGLE PERSON CATERING VEHICLE

BACKGROUND OF THE INVENTION

The present invention relates generally to a service vehicle and particularly to a vehicle having a plurality of storage and/or cargo areas that can be located in raised positions relative to the chassis. More specifically, the present invention relates to a catering vehicle which finds advantageous use in servicing locations with elevated cargo areas such as airplanes.

Currently available catering vehicles for servicing airplanes are large vehicles with limited visibility and versatility. They are also relatively expensive to manufacture and to operate, and require at least two operators to maneuver and handle the vehicle or to act as "spotters" during vehicle positioning.

As noted in U.S. Pat. No. 3,499,562, the loading and unloading of an airplane has presented special problems not encountered in any other field. As an example, the airplane is located at a substantial elevation above the ground in the area where most of the loading and unloading must be accomplished, and it is difficult to position structure directly beneath this area due to the convex shape of an airplane's body. Also, airplanes are constructed of relatively thin, lightweight metal which can be easily damaged if struck by a heavy object, such as the body of a service vehicle, yet the service vehicle must still be positioned close to the airplane to facilitate loading and unloading. Therefore, it is necessary that the operator of the service vehicle be afforded maximum visibility so that he can maneuver the vehicle to a position in close proximity to the airplane without causing damage to the airplane.

The vehicle described in the '562 patent has several disadvantages. For example, it has poor rear visibility since the body blocks the rear view and, when the body is elevated, the frame for doing so blocks the rear view. More importantly, however, scissor-lift type vehicles are not designed for movement when in the elevated position since this can be dangerous. The '562 design also requires a non-standard half-cab, and actuators for raising the entire load of the body and any contents to the height of the airplane door, which increases its manufacturing costs and makes it less convenient to use and maintain.

It is also known to provide an aircraft catering vehicle with a raised, fixed main platform, a movable canopy and a movable front platform. This prior art catering vehicle did not include a rear loading platform.

Accordingly, it is an object of the invention to provide a maneuverable service vehicle with an elevated cargo area having a protective cover which can be raised or lowered, a front moveable loading platform, and a rear elevator to load and unload cargo to and from the elevated cargo area.

Another object of the invention is to provide a service vehicle for an airplane which provides the operator with substantially unobstructed, 360° vision to facilitate close positioning of the vehicle to an airplane without causing damage to the airplane.

It is a still further object of the present invention to provide a service vehicle which is operable by a single occupant, which does not require spotters or assistants, and which can be manufactured and used in a highly efficient and cost-effective manner.

It is yet another object of the present invention to provide a versatile service vehicle having a relatively large payload, and one that is suitable to conveniently load and unload cargo from airplanes that are of various types and sizes.

SUMMARY OF THE INVENTION

These and other objects are provided by the present invention, which overcomes the disadvantages of prior elevated service vehicles, and also provides new advantages not available with such vehicles.

The aircraft catering vehicle of the present invention includes a vehicle chassis with front and rear pairs of wheels, and a cab mounted to said chassis. The cab has front, rear and side windows which provide substantially 360° field of vision to an operator positioned in the cab. The vehicle also has a first platform mounted in fixed position on the chassis. The first platform is elevated so as not to substantially restrict the 360° field of vision. A canopy covers the first platform and is movable between lower and upper positions. A second platform is mounted forward of the first platform. The second platform is positioned so as to not substantially interfere with the forward field of vision of the operator. The second platform is movable between a first elevation substantially the same as the first platform and a second raised elevation. A third platform is mounted rearward of the first platform, and is movable between the first elevation and a third lower elevation. Powered actuators are used to move the canopy and the second and third platforms.

In a preferred embodiment, the second platform terminates at a forward free end which is located to provide the operator with a forward field of vision extending at least 50° above horizontal. The second platform may have a width which is substantially coextensive with the width of the vehicle chassis, while the third platform may have a width which is substantially less than the width of the vehicle chassis, to accommodate a staircase to the first platform.

The movement of the canopy may be driven by at least one powered actuator positioned adjacent or above the first elevation. This powered actuator may include a a hydraulic cylinder which lies in a substantially horizontal plane. The canopy may also be connected to cables positioned at or above the first elevation. The cables can be operably connected to the hydraulic cylinder.

During travel, when the canopy is in the lowered position, the height of the vehicle is less than 13' 8". In the preferred embodiment, there is an adjustable height range between the first and second platforms of about 30 inches, and the third platform is capable of moving a distance of at least about 36 inches. The third platform may be capable of moving anywhere between an initial loading position (e.g., either ground level and/or loading dock and/or lower cargo area heights) and higher elevations (e.g., level with the first platform).

A method of operating a catering vehicle for servicing an airplane with a cargo door is also a part of the present invention. The method includes the step of providing a vehicle having a chassis and a cab mounted to said chassis. The cab has front, rear and side windows, and the vehicle includes a first platform mounted in an elevated, fixed position on the chassis. A canopy covers the first platform and is movable between lower and upper positions. A second platform is mounted forward of the first platform, and the second platform terminates in a forward free end. The second platform is movable between a first elevation substantially the same as the first platform and a second elevation above the first platform. A third platform is mounted rearward of the first platform, and is movable between the first elevation and a third elevation below the first elevation. Next, the vehicle is generally aligned with the cargo door of the aircraft, and is positioned so that the free end of the second platform is in close proximity to a side of the aircraft, and below the cargo door. The canopy is raised, and cargo located on the first platform is moved to the second platform. The second platform is raised to substantially the height of the cargo door. Cargo on the second platform is unloaded through the cargo door and into the airplane. The second platform is then unloaded to substantially the height of the cargo door, and these steps are repeated as necessary. The vehicle is then reversed and driven away from the aircraft. The platforms and canopy are configured and located so as to provide an operator positioned in the cab with a substantially 360° field of vision through the cab windows, and each of these steps may be performed by a single operator.

The method steps recited above can be preceded by the steps of first loading cargo onto the third platform, raising the third platform to the first elevation, moving the cargo from the third platform to the second platform, and repeating these steps as necessary.

BRIEF DESCRIPTION OF THE DRAWINGS

FIG. 8 is a side view of the catering vehicle, showing the front loading platform and the canopy in the lowered positions; and FIG. 9 is a side view similar to FIG. 8, showing the front loading platform and canopy in raised positions.

DESCRIPTION OF THE PREFERRED EMBODIMENTS

Figure 1:
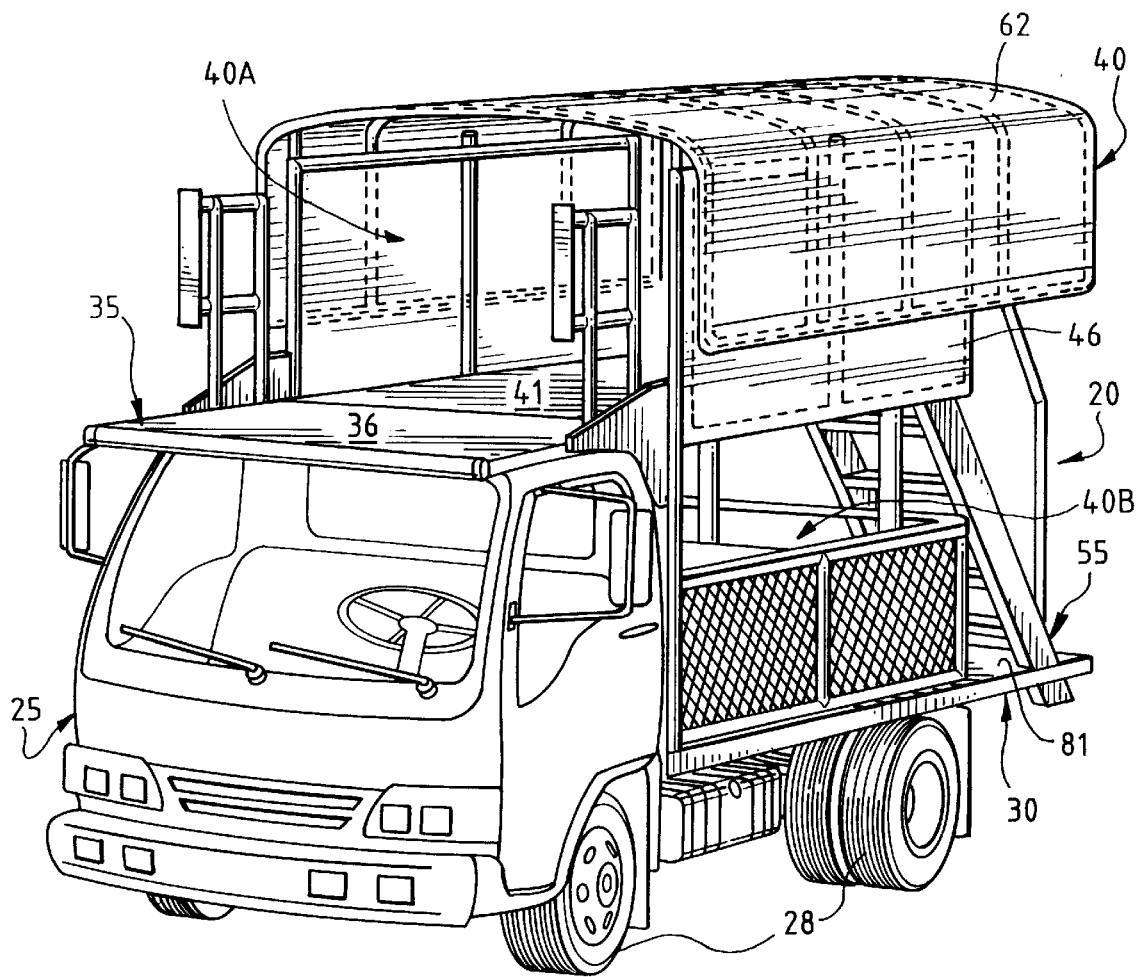
FIG. 1 is a perspective view of the catering vehicle of the present invention.
Figure 2:
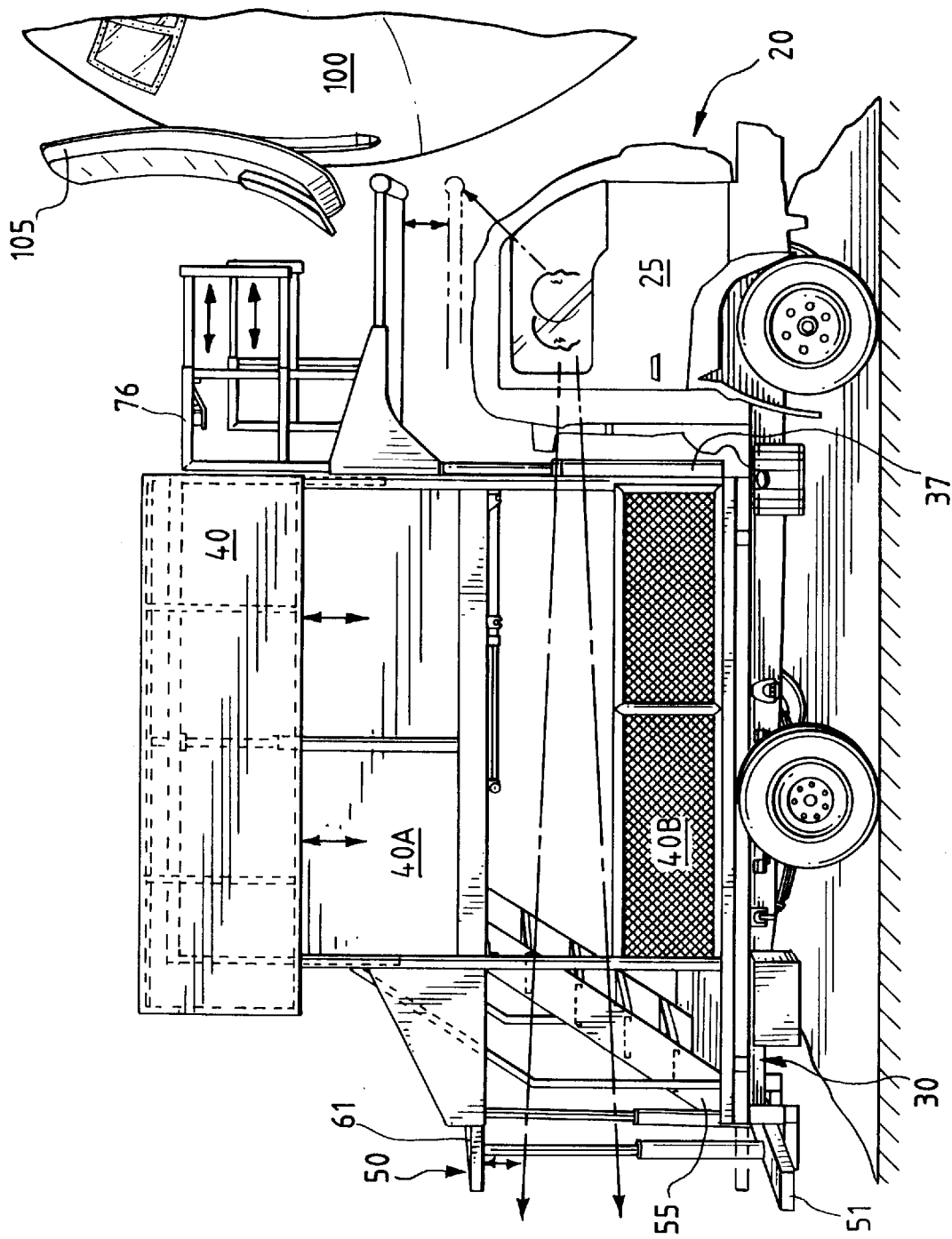
FIG. 2 is a side view of the catering vehicle in FIG. 1, illustrating the forward loading platform and canopy in raised positions.

Referring now to FIGS. 1 and 2, the catering vehicle of the present invention is generally designated as 20, and includes a cab 25 and a vehicle chassis 30 mounted on wheels 28. Vehicle 20 includes a cargo area, designated generally as 40, having sides 72, that is covered by a movable canopy 62 to protect the cargo area from the elements. Cargo area 40 has upper and lower cargo compartments 40A and 40B, respectively. Upper compartment 40A includes a raised floor or main platform 41, while the floor of lower compartment 40B may be the truck bed 81.

Figure 6:
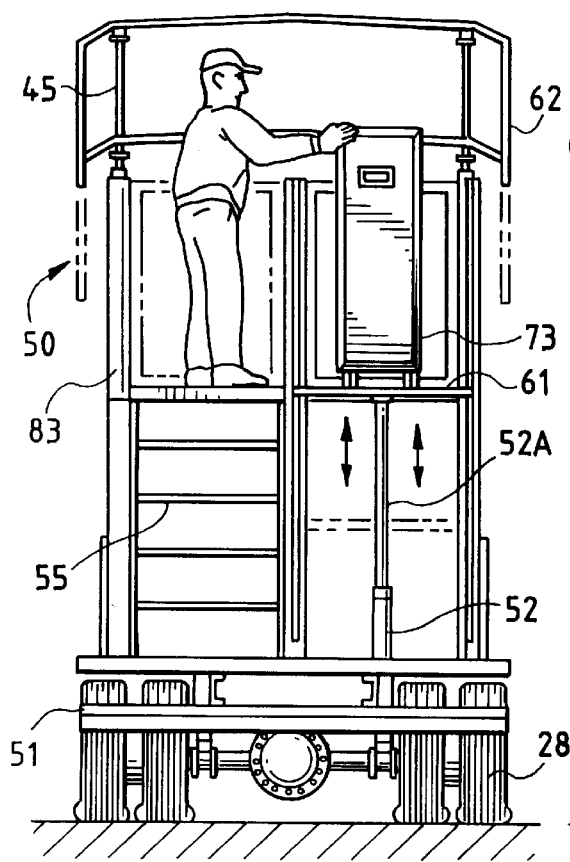
FIG. 6 is a rear view of the catering vehicle, illustrating the rear loading platform in the raised position.

Referring to FIGS. 1, 2 and 6, vehicle 20 also includes a front loading platform, designated generally as 35, which is raised and lowered by hydraulic cylinder 37 in a manner described below, and a rear loading platform, designated generally as 50, which is raised and lowered by hydraulic cylinder 52. Front and rear platforms 35 and 50 may each be mounted to main platform 41. Front loading platform 35 includes a floor 36, and may also include a collapsible pair of guard rails 76. The guard rails can each be fixed vertically, or either one or both of the guard rails can be collapsible. Forward platform 35 terminates in a free end 38, which may include a cushioning member 38A, such as a rubber bumper. Free end 38 may also include a sensor to detect when it has engaged a surface such as the side of an airplane.

Rear loading platform 50 has a floor 61 which preferably has a width which is less than the entire width of the vehicle (such as one-half the vehicle width, as shown), to accommodate stairway 55. Stairway 55 can be accessed by step 51, and permits an operator to mount main platform 41 without using rear loading platform 50. The widths of main platform 41 and rear loading platform 50 are preferably coextensive with the vehicle width.

Rear loading platform 50 can be positioned at a lower level adjacent the ground, for easy access by an operator. Rear loading platform 50 can also be positioned at an intermediate level which is located at the height of a conventional loading dock, to facilitate dock loading. Finally, rear loading platform 50 can be positioned at an elevated level which is approximately the height of main platform 41, so that cargo can be transferred between the two platforms during operation of the catering vehicle 20, as described below. In the preferred embodiment, these lower, intermediate and elevated levels for rear loading platform 50 are approximately 30, 50 and 86 inches above ground level. Of course, rear loading platform 50 may only need to move between a conventional dock height (e.g., about 50 inches) and the height of the main platform. In the preferred embodiment, main platform 41 is located 86 inches above the ground, and forward platform 35, when raised to its upper position, it is at a height of about 115 inches. When in the lowered, travelling position, forward platform 35 is at substantially the same height as main platform 41. Various powered actuators can be used to accomplish these movements, such as single-stage cylinders, telescoping cylinders, or other cable or pulley systems or linear actuators.

Figure 5:
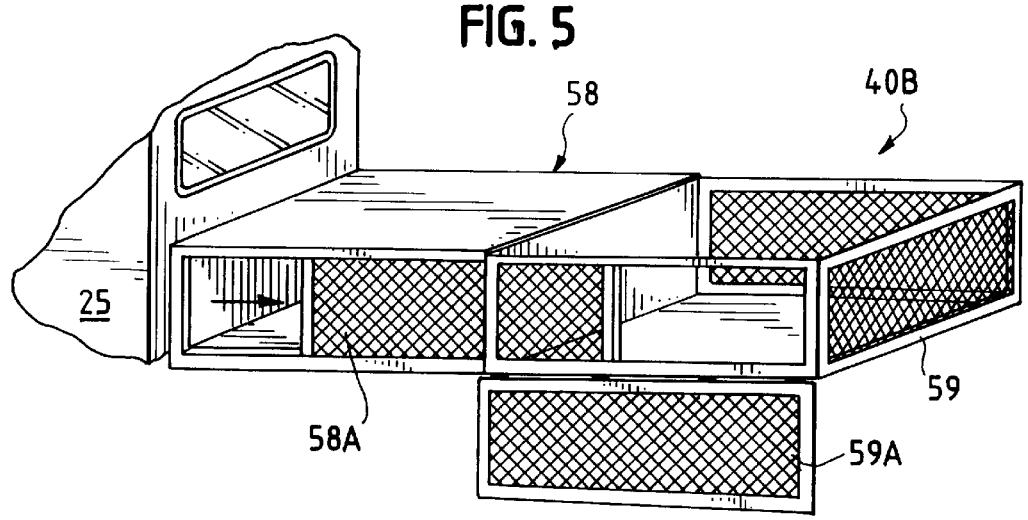
FIG. 5 is a partial perspective view of the lower cargo area.

Referring back to cargo area 40, upper cargo compartment 40A may include front doors (not shown) and rear doors 73, and has a main platform 41 that is at substantially the same height as floor 36 of front loading platform 35 when platform 35 is in its lowered position. Referring to FIG. 5, lower cargo compartment 40B may include a rear door(s) (not shown), as well as forward and rear storage cabinets 58 and 59, respectively. As one example, cabinet 58 may have a slidable, lockable door 58A for storing liquor, while cabinet 59 may have a hinged door 59A, as shown.

Cab 25 includes large front, side and rear windows to provide the operator with unobstructed 360° vision. For this purpose, upper cargo compartment 40A is fixed at an elevated position, as shown, so that the operator is provided with an unobstructed rear view. Lower cargo compartment 40B is also of limited height so that it does not block the rear sightline of the operator, as shown in FIG. 2. Further, cargo within cargo areas 40A or 40B will not block the rear sight line of the operator, either. The movable canopy does not block operator view, as explained below. Nor does forward platform 35. Free end 38 of forward platform 35 terminates at a point sufficiently adjacent to, and rearward of, the forward end of the cab so that platform 35 is not visible to the driver, and does not obscure the view the driver would have if there were no forward platform present.

In the preferred embodiment shown in the drawings, the driver is provided with a forward sight line which is at least about 50° above horizontal. This forward sight line is aided by the use of cab 25, which is preferably a "cabover" type in which the cab is mounted over the front axle, and which has a relatively flat forward profile. The combination of the use of a cab with a relatively flat forward profile, and a forward loading platform with a free end which is positioned at a vertical distance which is rearward of, or about equal to, the forward end of the cab, provides the driver with a forward sight line which is not obstructed by the forward loading platform.

Suitable control mechanisms are provided within the cab for controlling the movement of the front and rear loading platforms, as well as the canopy. Redundant remote controls can be provided at locations adjacent to the front and rear loading platforms so that their movement can be controlled by an operator riding on a platform.

Figure 7:
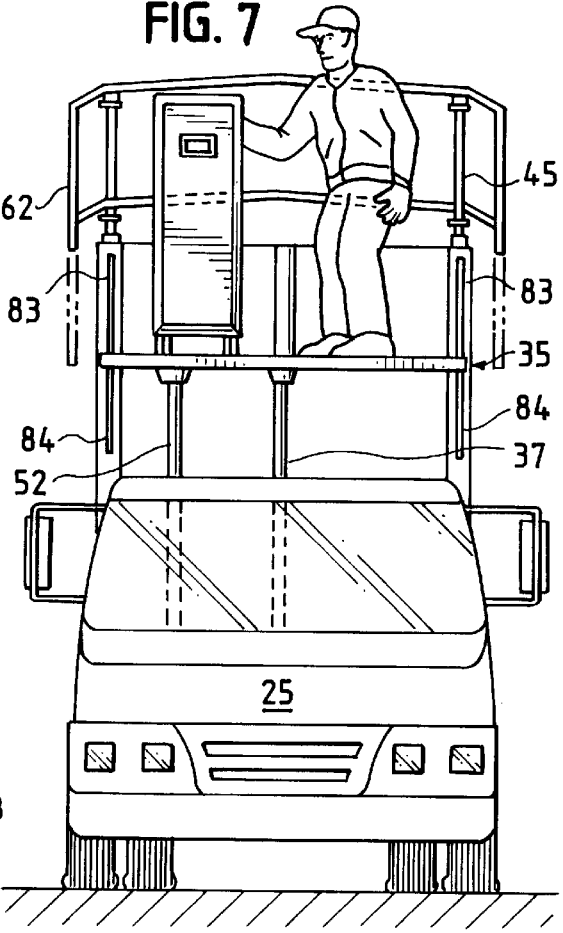
FIG. 7 is a front view of the catering vehicle, illustrating the front loading platform in the raised position.

Referring to FIG. 7, the operational movement of forward platform 35 will now be described. Steel tubes 83 are attached to platform 35, and are carried by and move within vertical, slotted tracks 84. A similar arrangement can be used for rear loading platform 50, if desired. To prevent binding, high strength, low friction wear pads (not shown), are attached to gussets (also not shown) that ride with tubes 83. These wear pads are preferably made of a material known as Polystone® (UHMW-PE), available from Service Plastics and Safety, Inc. of Memphis, Tenn.

Figure 3:
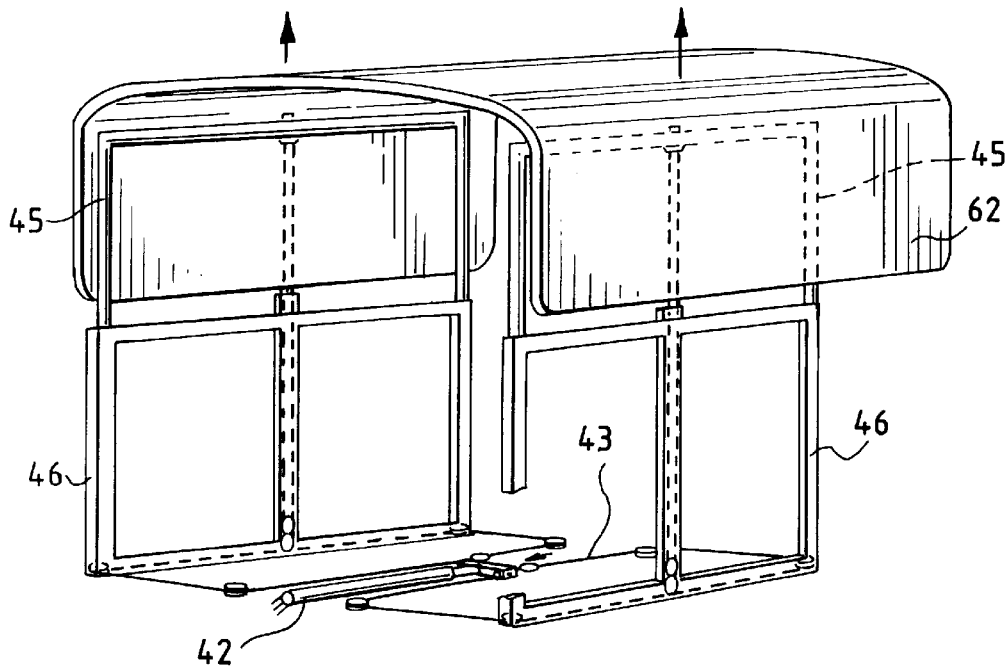
FIG. 3 is a perspective view of the canopy and canopy frame.
Figure 4:
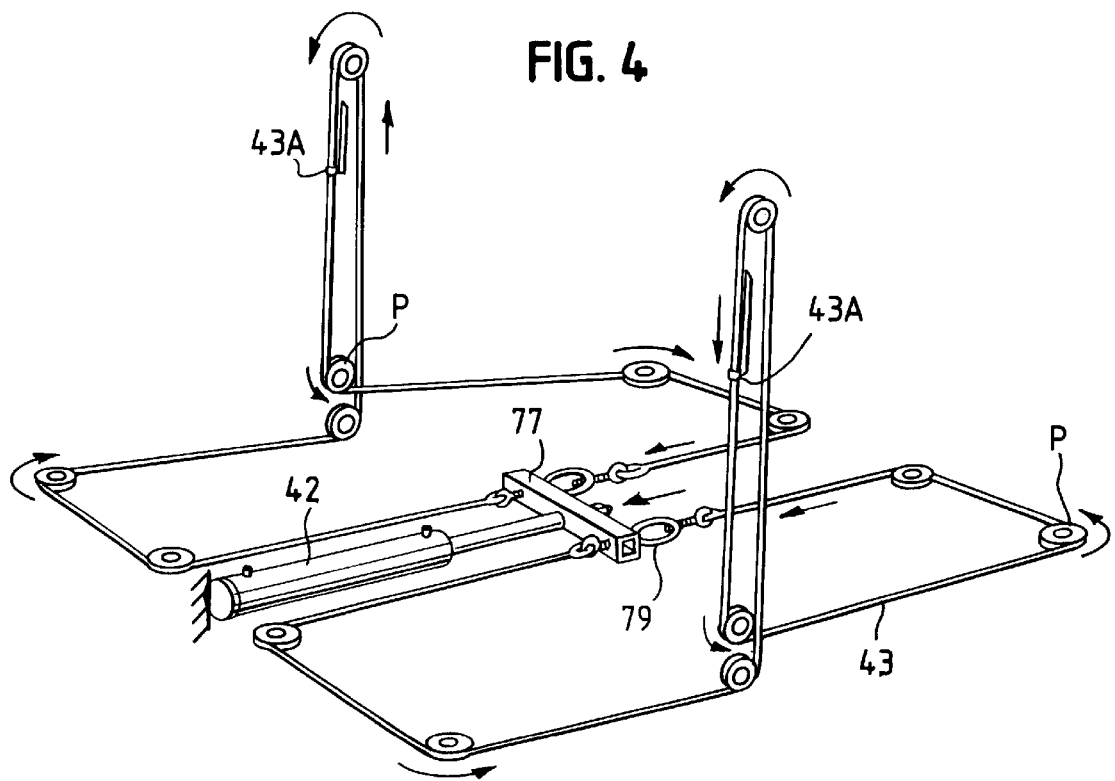
FIG. 4 is a perspective view of the actuator system for raising and lowering the canopy.

Referring to FIGS. 3 and 4, the operation of canopy 62 occurs as follows. As the piston rod of hydraulic cylinder 42 is retracted, for example, cable 43 is urged by multiple pulleys P of the pulley system shown (all pulleys are fixed on their centers), in the direction of the arrows. The end of the piston rod is fixed to transverse member 77, and two ends of cable 43 are attached by eye rings 79 to opposite ends of member 77. Retraction of cylinder 42 thus causes upper canopy frame 45 to lower relative to lower canopy frame 46, since a portion of upper canopy frame 45 is attached at cable points 43A (FIG. 4). In this manner, the canopy can be raised and lowered, as shown in FIGS. 8 and 9. While this is the preferred embodiment for moving the canopy, alternative powered methods, such as those employing hydraulic or air cylinders, could be used as well.

As will now be appreciated, canopy 62 always maintains its horizontal relationship and coverage over cargo area 40, whether it is in its raised or lowered positions. When the canopy is in its raised position, there is a sufficient distance between main platform 41 and canopy 62 to permit the operator to walk erect, to facilitate loading. Canopy 62 also does not block the rear sight line of the operator. Thus, cylinder 42 is positioned in a horizontal orientation immediately below main platform 41, as best shown in FIGS. 2 and 8–9. Power actuators 37 and 52 for moving forward and rear loading platforms 35 and 50, respectively, are also positioned so as to not interfere with storage capabilities.

Referring to FIG. 2, and as should now be appreciated, vehicle 20 provides superior sightlines to that of other known catering vehicles. The operator is provided with an unobstructed view in 360°, including a vertical sight line in the forward direction of at least about about 50° above the ground level. Thus, vehicle 20 permits the operator to simultaneously view both the free end of the forward platform as well as the airplane during approach. This is critical to proper positioning of the vehicle without the assistance of a spotter or other assistant.

Referring to FIG. 2, to operate vehicle 20, the loaded truck is driven to a waiting airplane 100, and generally aligned with airplane cargo door 105. The vehicle is moved toward the plane until bumper 38A is in sufficiently close proximity to the side of the airplane. The vehicle is now placed in park, the parking brake is set, and the wheel(s) are blocked. The operator proceeds to the hydraulic station at the stairway, and raises the canopy so that cargo can be transferred from main platform 41 to forward platform 35. Then, forward platform 35 is raised to the approximate elevation of the aircraft door sill height. Any necessary further loading of the upper compartment area (e.g., from the lower compartment area) can be accomplished by raising and lowering rear platform 50. The canopy is also raised to permit the operator to access the upper compartment. Guard rails 76 are now extended on the forward loading platform 35, and cargo is transferred from main platform 41 to forward platform 35. Once a suitable amount of cargo is in place on platform 35, it is raised to the height of the airplane cargo door, and unloading onto the airplane is accomplished. Forward platform 35 may then be lowered to the height of main platform 41, and this process is repeated until loading is finished.

Catering vehicle 20 is versatile. In the preferred embodiment, for example, the forward loading platform can be adjusted to any height between a travel position adjacent the cab roof (in the preferred embodiment, this is about 87" above ground level) to a maximum raised position of about 116" above ground level. Also, the third (rear) platform can be adjusted between an initial loading height (either near ground level and/or loading dock and/or lower cargo area heights) and the height of the raised first platform. When the canopy is lowered for travel, the overall vehicle height is less than 13', 8" (the legal height limit for highway transportation). The vehicle shown in the drawings has been successfully used to load and unload various airplanes, including MD80s, 727s, 737s and DC9s. Vehicle 20 is also more economical than other airline catering vehicles, since it is smaller and more maneuverable than other comparable vehicles, yet retains a relatively large payload, consumes less fuel, and only requires a single operator to use.

It will be obvious to one skilled in the art that various changes may be made in the described embodiment of the invention without departing from the spirit and scope thereof and, therefore, the invention is not limited by that which is illustrated in the drawings and described in the specification, but only as indicated in the accompanying claims.

We claim:

1. An aircraft catering vehicle, comprising:
   a chassis with front and rear pairs of wheels;
   a cab mounted to said chassis and having front, rear and side windows providing substantially 36020 field of vision to an operator positioned in the cab;
   a first platform mounted in fixed position on said chassis, said platform being elevated so as not to substantially restrict said 360° field of vision;
   a canopy covering said first platform and movable between lower and upper positions;
   a second platform mounted forward of said first platform, said second platform being positioned so as to not substantially interfere with the forward field of vision of the operator, and said second platform being movable between a first elevation substantially the same as said first platform and a second raised elevation;
   a third platform mounted rearward of said first platform, said third platform being movable between said first elevation and a third lower elevation; and
   powered actuators to move said canopy and said second and third platforms.

2. The catering vehicle of claim 1, wherein said second platform terminates at a forward free end located to provide the operator with a forward field of vision extending at least 50° above horizontal.

3. The catering vehicle of claim 1, wherein said second platform has a width substantially coextensive with the width of said vehicle chassis.

4. The catering vehicle of claim 1, wherein said third platform has a width which is substantially less than the width of the vehicle chassis, said third platform width being sufficient to accommodate a staircase to said first platform.

5. The catering vehicle of claim 1, wherein the movement of said canopy is driven by at least one powered actuator positioned adjacent or above said first elevation.

6. The catering vehicle of claim 5, wherein said at least one powered actuator comprises a hydraulic cylinder which lies in a substantially horizontal plane.

7. The catering vehicle of claim 5, wherein said canopy is connected to cables positioned at or above said first elevation, said cables being operably connected to said at least one hydraulic cylinder.

8. The catering vehicle of claim 1, wherein the height of the vehicle is less than 13' 8" when said canopy is in said lower position.

9. The catering vehicle of claim 1, wherein the distance between said first and said second elevations is at least about 30 inches.

10. The catering vehicle of claim 1, wherein said third platform is capable of moving a distance of at least about 36 inches.

11. The catering vehicle of claim 1, wherein said third platform is capable of moving between first, second and third positions.

12. A catering vehicle having a chassis with front and rear pairs of wheels, and a cab mounted to said chassis, said cab having front, rear and side windows, comprising:

a first platform mounted in an elevated, fixed position on said chassis;

a canopy covering said first platform and movable between lower and upper positions;

a second platform mounted to said chassis forward of said first platform, said second platform movable between a first elevation substantially the same as said first platform and a second elevation above said first platform;

a third platform mounted to said chassis rearward of said first platform, said third platform being movable between said first elevation and a third elevation below said first elevation; and powered actuators to move said canopy and said second and third platforms;

wherein said platforms and said canopy are configured and located so as to provide an operator positioned in the cab with a field of vision of substantially 360° through the cab windows.

13. A method of operating a catering vehicle for servicing an airplane having a cargo door, the vehicle having a chassis and a cab mounted to said chassis, said cab having front, rear and side windows, and the vehicle including a first platform mounted in an elevated, fixed position on said chassis, a canopy covering said first platform and movable between lower and upper positions, a second platform mounted to said chassis forward of said first platform, said second platform terminating in a forward free end and movable between a first elevation substantially the same as said first platform and a second elevation above said first platform, and a third platform mounted to said chassis rearward of said first platform, said third platform being movable between said first elevation and a third elevation below said first elevation, comprising the steps of:

a. generally aligning the vehicle with the cargo door of the aircraft;

b. positioning the vehicle so that said free end of said second platform is in close proximity to a side of the aircraft, and below the cargo door; raising the canopy;

c. moving cargo located on said first platform to said second platform;

d. raising said second platform to substantially the height of the cargo door;

e. unloading the cargo on said second platform through the cargo door and into the airplane;

f. lowering the second platform to substantially the height of the cargo door;

g. repeating steps c. through e. as necessary; and h. reversing the vehicle and driving away from the aircraft;

wherein said platforms and said canopy are configured and located so as to provide an operator positioned in the cab with a substantially 360° field of vision through the cab windows, and wherein each of steps a.–e. and g.–h. are performed by a single operator.

14. The method of claim 13, further comprising the following steps to precede step a.:

i. loading cargo onto said third platform;

i. raising said third platform to said first elevation;

j. moving said cargo from said third platform to said second platform;

k. performing steps a.–g.; and l. repeating steps i.–l. as necessary.

* * * * *